(12) United States Patent
Pugh

(10) Patent No.: US 10,894,580 B2
(45) Date of Patent: Jan. 19, 2021

(54) SLIDING ROOF PANEL ASSEMBLY AND METHOD FOR ITS OPERATION

(71) Applicant: LEWMAR LIMITED, Hampshire (GB)

(72) Inventor: Geraint Pugh, Southampton (GB)

(73) Assignee: LEWMAR LIMITED, Hampshire (GB)

( * ) Notice: Subject to any disclaimer, the term of this patent is extended or adjusted under 35 U.S.C. 154(b) by 401 days.

(21) Appl. No.: 15/918,467

(22) Filed: Mar. 12, 2018

(65) Prior Publication Data

US 2018/0273145 A1  Sep. 27, 2018

(30) Foreign Application Priority Data

Mar. 22, 2017 (GB) .................................. 1704534.5

(51) Int. Cl.
*B63B 17/02* (2006.01)
*B60J 7/043* (2006.01)

(52) U.S. Cl.
CPC ............. *B63B 17/02* (2013.01); *B60J 7/0435* (2013.01); *B63B 2017/026* (2013.01)

(58) Field of Classification Search
CPC ... B63B 17/02; B63B 2017/026; B63B 19/18; B60J 7/02; B60J 7/022; B60J 7/024;
(Continued)

(56) References Cited

U.S. PATENT DOCUMENTS 4,619,480 A * 10/1986 Motoyama .................. B60J 7/22
296/217
4,650,243 A * 3/1987 Hanley ....................... B60J 7/05
296/216.02

(Continued)

FOREIGN PATENT DOCUMENTS

DE  102005059287  6/2007
EP       0221241  5/1987
(Continued)

*Primary Examiner* — Ajay Vasudeva
(74) *Attorney, Agent, or Firm* — Leason Ellis LLP

(57) ABSTRACT

A sliding roof panel assembly for covering a roof opening of a marine craft is disclosed. The sliding roof panel assembly comprises a slide guide for attachment along one side of the roof opening, a roof panel which is slidably moveable between an open and lifted position and a closed and lowered position, the roof opening being covered by the roof panel in the closed and lowered position, and a slide assembly guided for travel along the slide guide and supporting the roof panel. The slide guide has a slide track and a guide rail, the slide track and the guide rail each extending along the slide guide, the guide rail having a forward depressed portion and a rearward raised portion. The slide assembly comprises a drive slide driveably moveable along the slide track of the slide guide, a guide rail follower supported by and moveable along the guide rail, the guide rail follower supporting the roof panel, and a first lever, linking the drive slide and the roof panel via respective rotatable links. In use, the roof panel is slidably moveable from the open and lifted position to the closed and lowered position by driving the drive slide forward in the slide track to move the guide rail follower forward along the rearward raised portion of the guide rail until the guide rail follower reaches the forward depressed portion of the guide rail. The guide rail follower travels downwardly along the forward depressed portion of the guide rail relative to the drive slide by the weight of the roof panel and rotation of the first lever, the roof panel following the movement of the guide rail follower downwardly towards the closed and lowered position.

21 Claims, 14 Drawing Sheets

(58) Field of Classification Search
CPC ... B60J 7/026; B60J 7/028; B60J 7/043; B60J 7/00435; B60J 7/053
See application file for complete search history.

(56) References Cited

U.S. PATENT DOCUMENTS

| | | | | |
|---|---|---|---|---|
| 4,911,497 | A * | 3/1990 | Schreiter | B60H 1/262 296/214 |
| 5,020,849 | A * | 6/1991 | Schlapp | B60J 7/05 296/221 |
| 6,454,347 | B2 * | 9/2002 | Lee | B60J 7/0435 296/216.03 |
| 6,527,337 | B2 * | 3/2003 | Farber | B60J 7/041 296/220.01 |
| 7,178,862 | B2 * | 2/2007 | Oechel | B60J 7/024 296/216.02 |
| 7,255,385 | B2 * | 8/2007 | Queveau | B60J 7/146 296/107.01 |
| 7,762,623 | B2 * | 7/2010 | De Jong | B60J 7/22 296/217 |
| 8,061,290 | B2 * | 11/2011 | de Waal | B60J 7/0435 114/201 R |
| 2005/0231007 | A1 | 10/2005 | Oechel | |
| 2010/0066130 | A1 | 3/2010 | Rashidy et al. | |
| 2010/0077952 | A1 | 4/2010 | De Waal | |

FOREIGN PATENT DOCUMENTS

| | | | |
|---|---|---|---|
| EP | 2168798 | 3/2010 | |
| FR | 2969539 | 6/2012 | |
| JP | 61071216 A * | 4/1986 | ............... B60J 7/22 |
| JP | 61071217 A * | 4/1986 | ............... B60J 7/053 |
| JP | 61 160319 | 7/1986 | |
| JP | 61205514 A * | 9/1986 | ............... B60J 7/053 |
| JP | H0434090 | 8/1992 | |

* cited by examiner

SLIDING ROOF PANEL ASSEMBLY AND METHOD FOR ITS OPERATION

CROSS-REFERENCE TO RELATED PATENT APPLICATIONS

The present application claims priority under 35 U.S.C. § 119 to GB Patent Application No. 1704534.5, filed Mar. 22, 2017, which is hereby incorporated by reference in its entirety.

BACKGROUND TO THE INVENTION

Field of the Invention

The present invention relates to a sliding roof panel assembly and a method for the operation of such a sliding roof panel assembly. A suitable sliding roof panel is a sunroof. The present invention has particular, but not necessarily exclusive, application to marine applications such as for pleasure craft.

Related Art

An opening in a vehicle roof can be covered and uncovered using a sliding roof panel, referred to herein as a "panel". The panel may comprise light-transmitting material, such as glass. In known systems, the sliding panel can be moved to between a position in which the opening is sealingly closed and a position in which the opening is uncovered. Such systems typically move the panel in two stages. To uncover the opening, the panel is first lifted from a seal around the opening and then the panel is translated along a track progressively to uncover the opening. To enable this sequence of movements, known mechanisms typically require forced frictional interaction of complex parts which can result in wearing, particularly when the panel is heavy. Over time, this can result in decreased tolerances between parts which can cause seal failure, rattling and material failure. Additionally, the complexity, precision and material quality required by such parts add to the manufacturing cost.

For example, EP-A-2168798 discloses an assembly for covering an opening of a vehicle with a panel. The panel is slidably attached to guide rails which run alongside the opening. In EP-A-2168798, the panel is guided at its forward end by a drive slide which is driven along the guide rails. A raising lever attached to the panel has first and second slide shafts which are driven along different respective movement paths by virtue of their travel along a specifically shaped channel in the drive slide and along a specifically shaped locator channel fixed with respect to the guide rail. In this way, the lever is rotated during the travel of the drive slide to lift (during opening of the panel) or lower (during closing of the opening) the panel with respect to the seal around the opening.

Although the arrangement disclosed in EP-A-2168798 has particular utility in automotive applications, in which the panel of the sunroof is typically lightweight, it has limited utility in larger scale applications, such as where the panel has substantial mass, by virtue of its area (e.g. it is used to cover a large opening) and/or by virtue of its thickness (e.g. it is intended to be load-supporting, such as capable of being walked on). The use of the complex mechanism as disclosed in EP-A-2168798 would be expected to be unsuitable for such robust applications.

SUMMARY OF THE INVENTION

Accordingly, the present inventors have devised the present invention seeking to provide a scalable sliding closure mechanism that has comparatively simple operation and a method for the operation thereof, allowing low cost of manufacture, ease of assembly and ease of maintenance.

The present invention has been devised in order to address at least one of the problems identified above. Preferably, the present invention reduces, ameliorates, avoids or overcomes at least one of the above problems.

Accordingly, in a first preferred aspect, the present invention provides a sliding roof panel assembly for covering a roof opening, the sliding roof panel assembly comprising:
a slide guide for attachment along one side of the roof opening;
a roof panel which is slidably moveable between an open and lifted position and a closed and lowered position, the roof opening being covered by the roof panel in the closed and lowered position;
a slide assembly guided for travel along the slide guide and supporting the roof panel, wherein the slide guide has a slide track and a guide rail, the slide track and the guide rail each extending along the slide guide, the guide rail having a forward depressed portion and a rearward raised portion,
the slide assembly comprising:
a drive slide driveably moveable along the slide track of the slide guide;
a guide rail follower supported by and moveable along the guide rail, the guide rail follower supporting the roof panel;
a first lever, linking the drive slide and the roof panel via respective rotatable links, wherein, in use, the roof panel is slidably moveable from the open and lifted position to the closed and lowered position by driving the drive slide forward in the slide track to move the guide rail follower forward along the rearward raised portion of the guide rail until the guide rail follower reaches the forward depressed portion of the guide rail, the guide rail follower travelling downwardly along the forward depressed portion of the guide rail relative to the drive slide by the weight of the roof panel and rotation of the first lever, the roof panel following the movement of the guide rail follower downwardly towards the closed and lowered position.

In a second preferred aspect, the present invention provides a marine pleasure craft having a sliding roof panel assembly according to the first aspect.

In a third preferred aspect, the present invention provides a method for the operation of the sliding roof panel assembly, the method comprising slidably moving the roof panel from the open and lifted position to the closed and lowered position by driving the drive slide forward in the slide track to move the guide rail follower forward along the rearward raised portion of the guide rail until the guide rail follower reaches the forward depressed portion of the guide rail, the guide rail follower travelling downwardly along the forward depressed portion of the guide rail relative to the drive slide by the weight of the roof panel and rotation of the first lever, the roof panel following the movement of the guide rail follower downwardly towards the closed and lowered position.

The present invention therefore provides a sliding roof panel assembly for opening and closing an opening, such as on a marine pleasure craft, and a method for the operation thereof. Furthermore, the sliding roof panel assembly is scalable, simple in operation, has a low cost of manufacture, is easy to assemble and is easy to maintain.

The first, second and/or third aspect of the invention may have any one or, to the extent that they are compatible, any combination of the following features.

It is recognised by the inventors that the present invention may be used on static structures, such as buildings. It is therefore, not necessarily limited only to use on a marine pleasure craft, although such application is at the time of writing a preferred application.

Preferably, the sliding roof panel assembly comprises more than one slide guide. Thus, a slide guide may be provided respectively on two opposing sides of the opening. In this case, the panel's weight can be shared between the slide guides. Distributing the panel's weight results in a more balanced and stable assembly.

Preferably, the sliding roof panel assembly further comprises a slave slidably moveable along the slide track of the slide guide with the drive slide. In this case there may be provided a second lever, the second lever linking the slave slide and the roof panel via respective rotatable links. In this case, having the slave slide and the drive slide moving together in the slide track provide a more stable and balanced operation to the mechanism in use. The slave slide and second lever help prevent the guide follower and the roof panel from jumping vertically, as explained in more detail below.

Preferably, when the assembly is in use moving the roof panel towards the open and lifted position, the slave slide is pushed along the slide track by the drive slide. The use of a slave slide helps prevent the guide follower and roof panel from being lifted when the roof panel is in the open and lifted position, preventing rattling and accidental further lifting of the panel, for example when the sliding panel assembly is mounted on a marine vessel in rough seas.

Preferably, the sliding roof panel assembly further comprises a locking element disposed within the slide track for defining a forward limit of motion for the slave slide along the slide track when the roof panel is in the closed and lowered position. In this case, the roof panel is prevented from accidentally lifting and opening when in a closed and lowered position. This is useful for when a seal between the roof panel and a lower frame needs to be kept, for example when the assembly is inclined in use where the weight of the panel may not provide an adequate lowering and sealing force.

Preferably, the drive slide has a bypass feature to permit the drive slide to travel forwardly of the locking element along the slide track. In this way, the position of the locking element may be fixed with respect to the track without interfering with the movement of the drive slide.

Preferably, the sliding roof panel assembly comprises an elastic member linking the drive slide to the slave slide. The elastic member may substantially bias the drive slide and slave slide together which prevents the slave slide from moving in an unstable manner behind the drive slide when the slide assembly moves on the slide track. This biasing also helps lift the roof panel when the guide follower travels from the forward depressed portion to the rearward raised portion, thereby reducing the force required to drive the drive slide rearward. Alternatively, the elastic member may substantially bias the drive slide and the slave slide apart which helps to prevent the guide follower and the roof panel from lifting when the roof panel is in the open and lifted position. A suitable elastic member may be one or more springs.

Preferably, the sliding roof panel assembly comprises: a connector linking the slide assembly to the panel; and a securing member, wherein the securing member is inserted through the connector to attach the connector to the roof panel. In this case, assembly is easier because the slide guide and slide assembly can be assembled together and the roof panel can simply be lowered onto the connector at a later time and secured easily with the securing member.

Preferably, the sliding roof panel assembly further comprises a drive cable for driving the drive slide. In this case, the drive slide can be driven remotely. This is particularly advantageous when access to the drive slide is difficult, for example if a trim covers the slide guide.

Preferably, the sliding roof panel assembly further comprises a drive motor which drives the drive cable. In this case, the roof panel can be opened and closed remotely and without manual effort by the operator.

The drive cable may have a helical protrusion at its outer circumference, for driving engagement with the motor.

Preferably, the drive cable is contained within a channel in the slide guide. In this case, the drive cable is prevented from buckling when the drive slide is driven forward. Additionally the drive cable is fully contained within the sliding roof panel assembly, which is safer and more aesthetically pleasing.

Preferably, the sliding roof panel assembly comprises a support pivot attached to a base structure surrounding the roof opening, the support pivot pivotally supporting the roof panel, wherein, in use, the roof panel pivots about the support pivot as the roof panel moves from a lifted position to a lowered position. In this case, the support pivot supports the panel as it rotates, resulting in a balanced and stable mechanism.

Preferably, the sliding roof panel assembly comprises a support track attached to the base structure surrounding the roof opening, wherein, in use, the support pivot slidably moves along the support track as the roof panel moves from the open and lifted position to a closed and lowered position. In this case, the roof panel is stably guided along the base structure as it moves forward and rearward.

Preferably, the drive slide is rotatably linked to the guide rail follower via the first lever. In this case, assembly and maintenance is simplified and the number of parts is reduced.

Preferably, the slave slide is rotatably linked to the guide rail follower via the second lever. In this case, assembly and maintenance is simplified and the number of parts is reduced.

Preferably, the roof panel is made of a light-transmitting material. In this case, a room or cabin in which the sliding roof panel assembly is installed can receive light even when the panel covers the opening.

Alternatively, the roof panel need not necessarily be formed of a light-transmitting material. For example, the roof panel may instead be formed of a composite material. In this case, the roof panel assembly has good structural integrity which is particularly advantageous in a marine environment. The composite material could be glass reinforced plastic (GRP).

Preferably, the method for the operation of the sliding roof panel assembly further comprises slidably moving the roof panel from the closed and lowered position to the open and lifted position by driving the drive slide rearward in the slide track to move the guide rail follower rearward along the forward depressed portion of the guide rail, the guide rail follower travelling upwardly along the forward depressed portion of the guide rail relative to the drive slide by reaction of the forward depressed portion and rotation of the first lever until the guide rail follower reaches the rearward raised portion of the guide rail, the roof panel following the movement of the guide rail follower upwardly towards the open and lifted position.

Further optional features of the invention are set out below.

BRIEF DESCRIPTION OF THE DRAWINGS

Embodiments of the invention will now be described by way of example with reference to the accompanying drawings in which.

Figure 1:
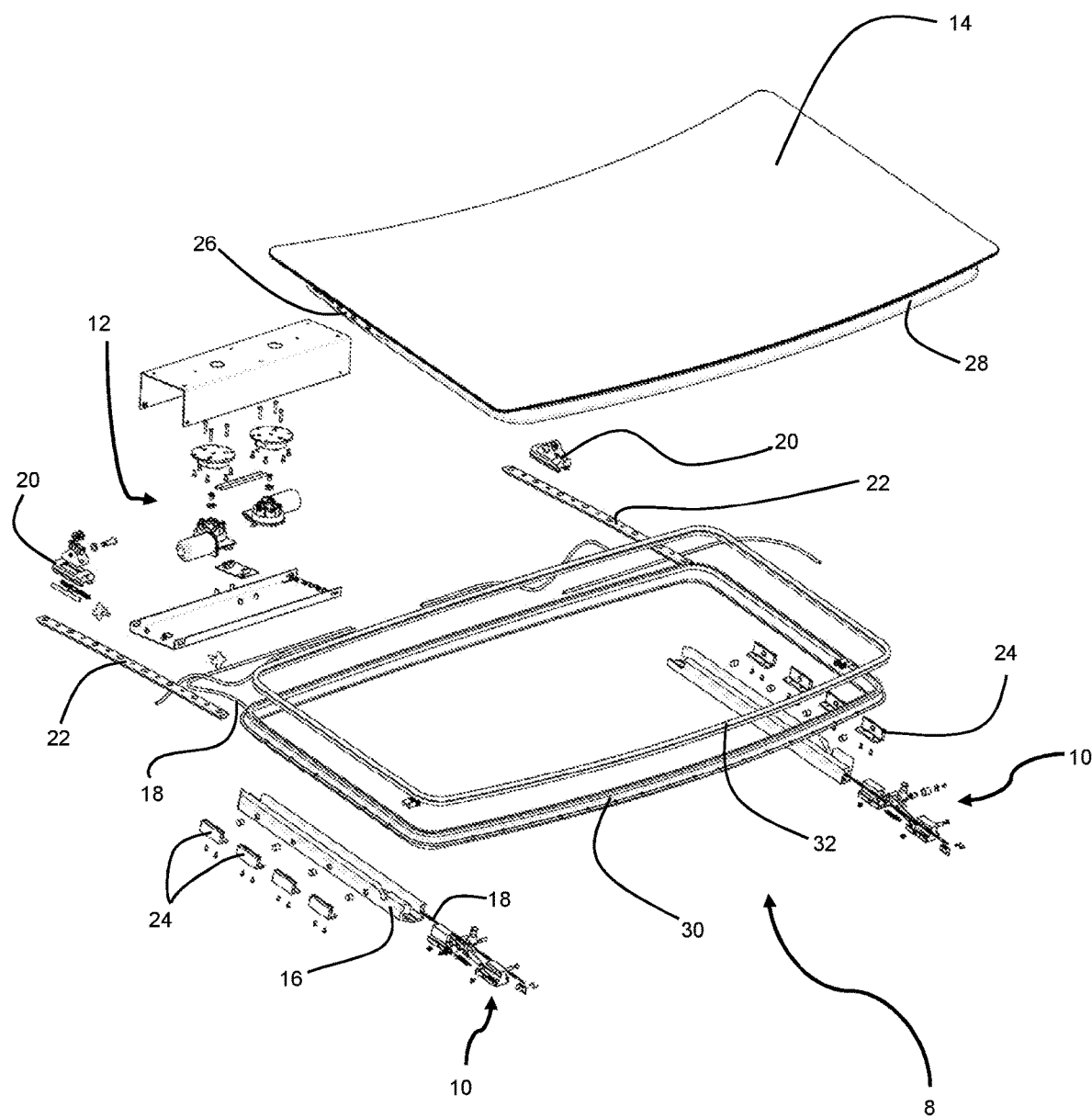
FIG. 1 shows a perspective exploded view of a sliding roof panel assembly, including a slide guide, a slide assembly and a drive motor assembly, according to an embodiment of the invention.

DETAILED DESCRIPTION OF THE PREFERRED EMBODIMENTS, AND FURTHER OPTIONAL FEATURES OF THE INVENTION

The preferred embodiments of the present invention provide a sliding roof panel assembly that is configured to move a roof panel from an open and lifted position to a closed and lowered position, and vice versa, where the sliding roof panel assembly is mechanically simple and scalable. The specific constructional details of the preferred embodiments will be discussed in more detail below. First, it is possible to set out some advantages of the preferred embodiments compared with known sliding panel assemblies.

It should be noted that, throughout this document, a forward direction is the direction in which the drive slide travels as the roof panel moves to a closed and lowered position. Similarly, a rearward direction is the direction in which the drive slide travels as the roof panel moves to an open and lifted position. An upward direction is the direction in which the roof panel substantially travels when it is raised away from an opening. Similarly, a downward direction is the direction in which the roof panel substantially travels when it is lowered towards an opening. These directions may not necessarily correlate with forwards and rearwards directions on a marine craft on which the assembly may be used.

The use of a sliding roof panel assembly according to the preferred embodiments reduces the likelihood of material failure and also simplifies the manufacturing, assembly and maintenance processes, compared with the prior art disclosures. The use of complex machined components can be avoided by using a drive slide rotatably linked to a roof panel via a lever arm and using a roof panel that is supported by a guide rail follower and that follows the downwards movement of the guide rail follower. Conversely, prior art disclosures (such as EP-A-2168798) use a mechanism where a roof panel follows a movement opposite to the movement of a guide rail follower. This movement requires more complex components to carry out because, for example in EP-A-2168798, it is essential to have more than two pivot points on the lever between drive slide and the roof panel.

The simple components of the present sliding roof panel assembly allow the use of simpler machining processes and may require less material, thereby reducing the overall cost of manufacture. Furthermore, given the smaller number of components, such an assembly is easy to assemble and maintain. The assembly can also be scaled easily as the size and the weight of the roof panel is increased. This means the mechanism works just as well for small panels (for example, on the roof of a small car) as it does for large panels (for example, on the roof of a large marine pleasure craft or a building). The complex nature of the prior art mechanisms means that they would be difficult to adapt to heavier panels and would require substantial redesign to ensure the mechanism is suitable.

A slave slide and second lever within the slide assembly give a more stable and balanced mechanism in use. The slave slide and second lever help prevent the guide follower and the roof panel from moving in a horizontal direction perpendicular to the direction of travel of the drive slide. Additionally, when the slave slide abuts the drive slide, the roof panel is prevented from lifting when the sliding roof panel assembly is in an uncovered position, thereby preventing rattling and unwanted lifting of the roof panel.

A lock in the sliding roof panel assembly, in combination with the slave slide and second lever, gives a simple mechanism by which a seal can be tightened and held when the roof panel is in the closed and lowered position. In prior art disclosures, this problem is solved by providing complex channels in the drive slide which are costly to design and manufacture and are difficult to scale.

In the drawings, features are indicated using reference numerals. Where the same feature is shown in more than one drawing, the reference numeral may be omitted if it has already been described with reference to an earlier drawing.

FIG. 1 shows a perspective view of a sliding roof panel assembly 8 according to an embodiment of the invention. The sliding roof panel assembly has a pair of mirror image slide guides 16 which each comprise a slide assembly 10. The slide guides 16 are attached to a base frame 30 by slide guide brackets 24. In some embodiments, the slide guide brackets 24 are fixed in a nonadjustable manner to the slide guides 16 and base frame 30. The base frame 30 is secured to a base structure (not shown in FIG. 1, but which may be the deck of a boat). A seal 32 is attached to an upper surface of the base frame 30. A roof panel 14 is mounted on a roof panel frame 28. The roof panel frame 28 is attached to the slide assemblies 10 and, when in a covered and sealed position, contacts and compresses the seal 32 on the base frame 30. The roof panel frame 28 is pivotally attached to support pivots 20 by roof panel brackets 26. The support pivots 20 are slidably disposed on support tracks 22. The support tracks 22 are fixed to the base structure. The slide assemblies 10 are driven by drive cables 18, the drive cables 18 being driven by a drive motor assembly 12.

The sliding roof panel assembly described and illustrated here has two slide guides 16, in order to distribute the weight of the roof panel and provide stable operation.

Figure 2:
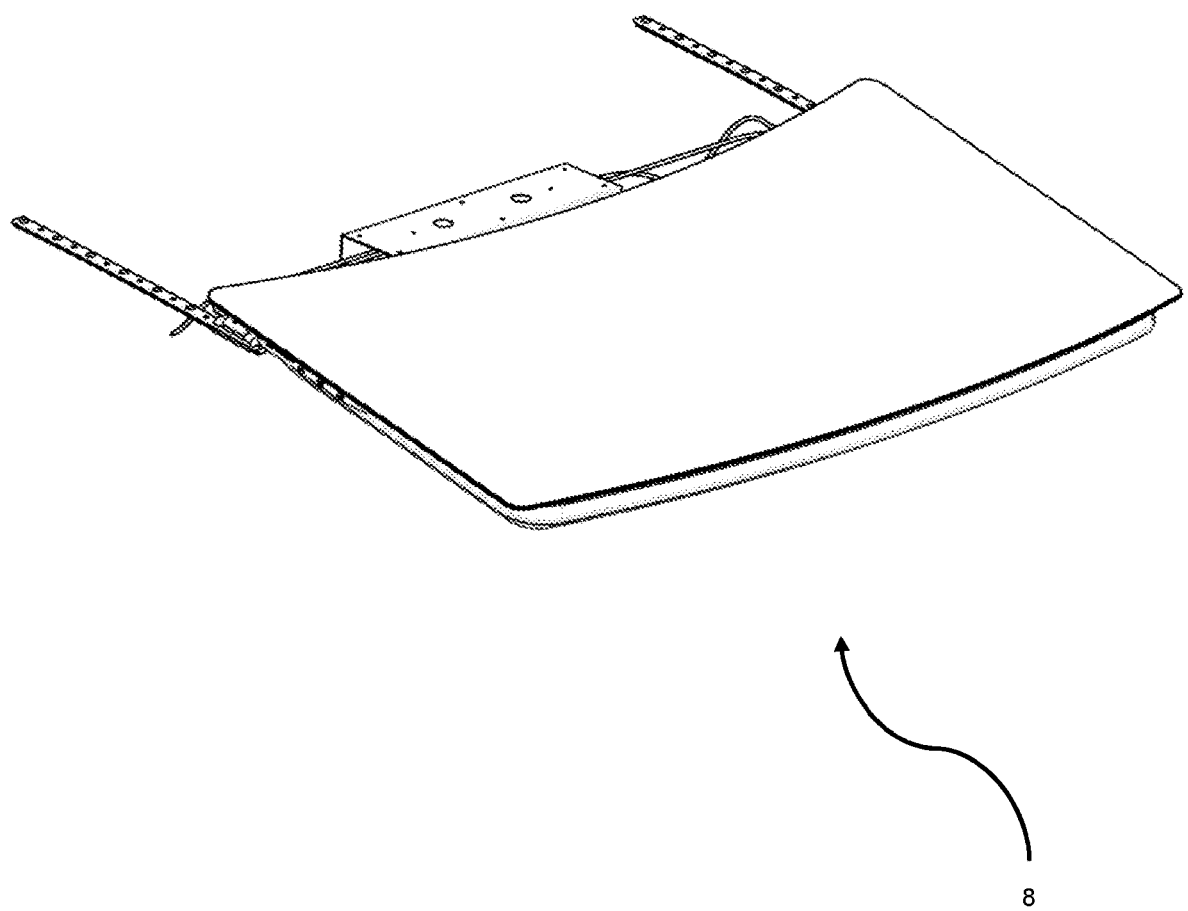
FIG. 2 shows a perspective view of an assembled sliding roof panel assembly of FIG. 1.

FIG. 2 shows a perspective view of the assembled components of FIG. 1.

Figure 3:
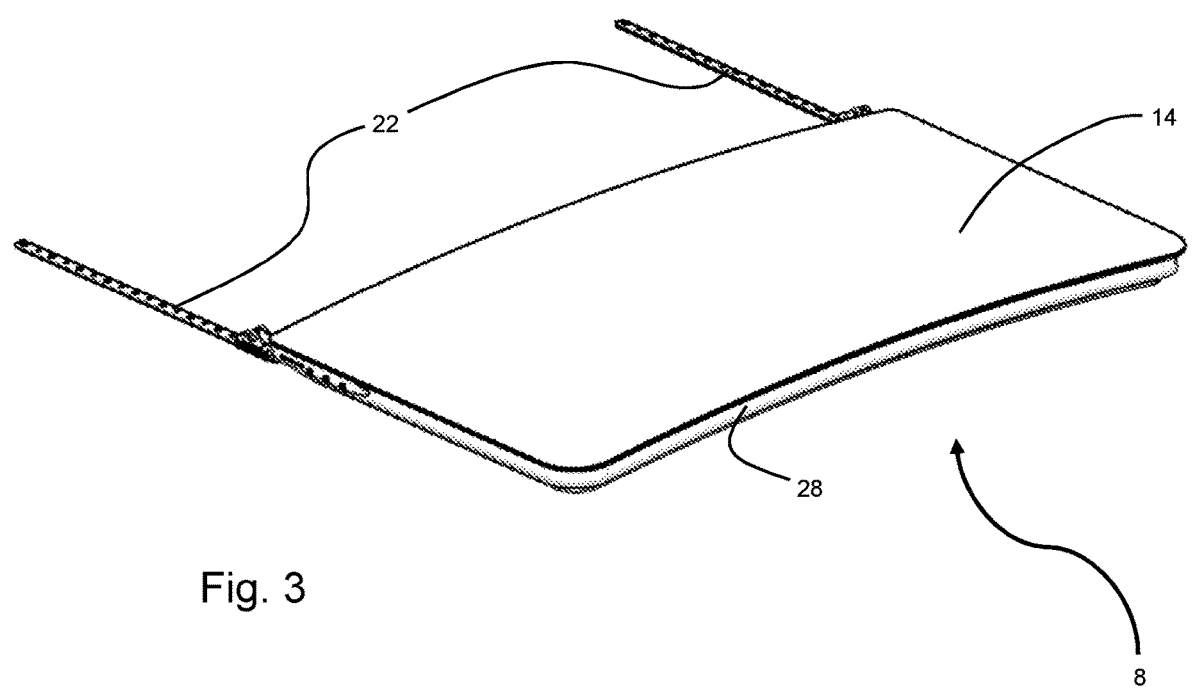
FIG. 3 shows a perspective view of the sliding roof panel assembly of FIG. 1 in a covered and sealed position.

FIG. 3 shows a perspective view of the sliding roof panel assembly 8 when it is in a closed and lowered configuration. In this configuration, the roof panel 14 is in a closed and lowered position where the roof panel 14 covers, and is lowered towards, an opening in a roof. When lowered, the roof panel frame 28 contacts and compresses the seal 32.

Figure 4:
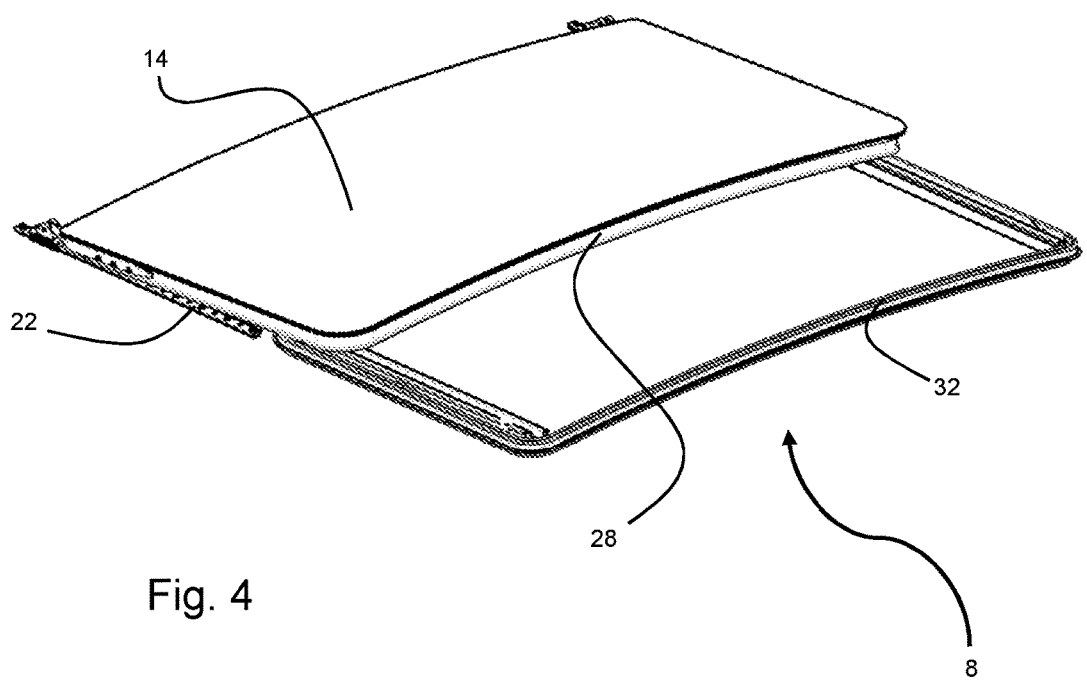
FIG. 4 shows a perspective view of the sliding roof panel assembly of FIG. 1 in an uncovered position.

FIG. 4 shows a perspective view of the sliding roof panel assembly 8 when it is in an open and lifted configuration. In this position, the roof panel 14 is in an open and lifted position and is lifted and tilted to allow movement along the slide guide 16.

Figure 5:
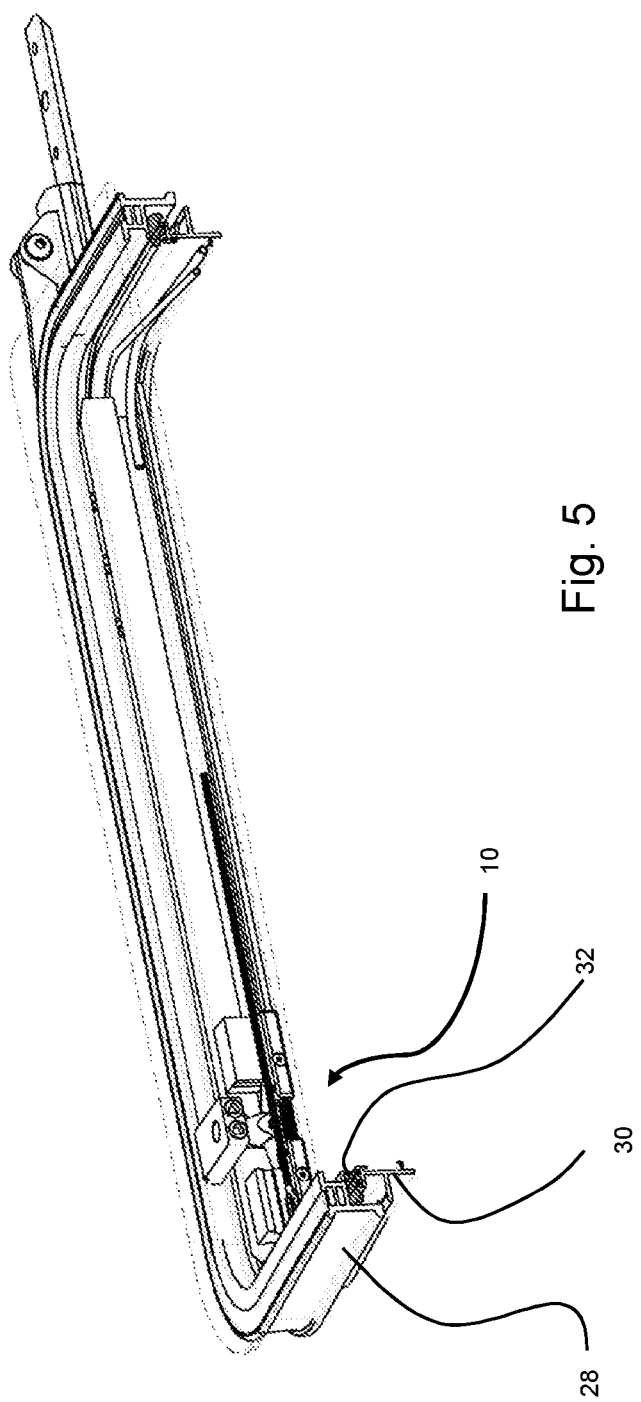
FIG. 5 shows a partial cutaway perspective view of the slide assembly of FIG. 1 and the surrounding structure

FIG. 5 shows a perspective view of the slide assembly 10 in a closed and lowered configuration in relation to the base frame 30 and the roof panel frame 28. In this configuration, the roof panel frame 28 contacts and compresses seal 32.

Figure 6:
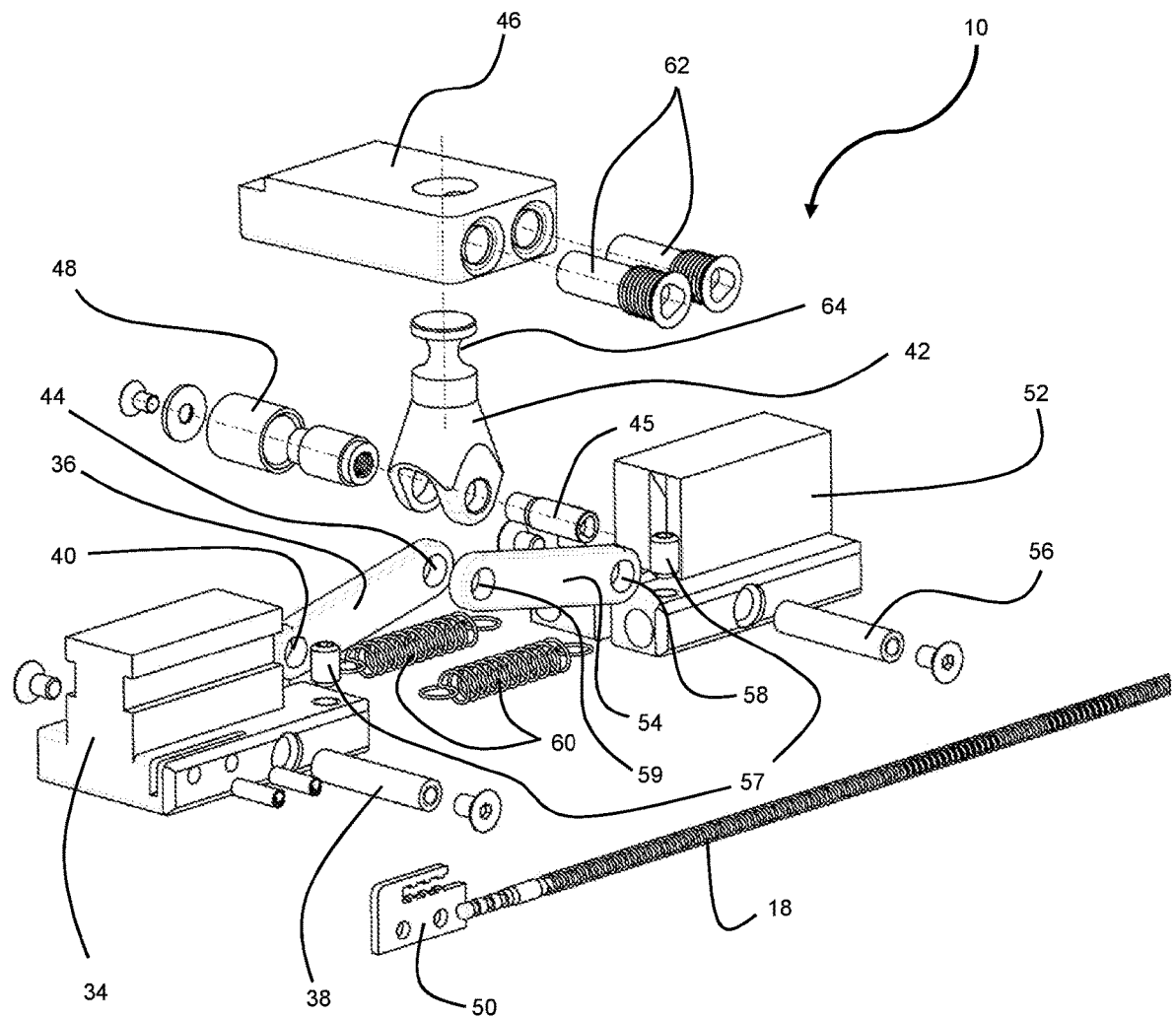
FIG. 6 shows a perspective exploded view of a slide assembly for use in an embodiment of the invention.

FIG. 6 shows a perspective view of the slide assembly 10. The slide assembly 10 includes a drive slide 34 and a connector 42. A first lever 36 rotatably links the drive slide 34 to the connector 42. The first lever 36 is rotatably attached to the drive slide 34 by a first pivot 38, near a first end 40 of the first lever 36. The first lever 36 is rotatably attached to the connector 42 by a connector pivot 45, near a second end 44 of the first lever 36. The connector 42 is rotatably attached to the roof panel 14 by an attaching member 46. A guide rail follower 48 is rotatably attached to the connector 42 by the connector pivot 45. The guide rail follower 48 is supported by slide guide 16 and supports the weight of the roof panel 14. The drive slide 34 is driven along the slide guide 16 by drive cable 18. The drive cable 18 is attached to the drive slide 34 by a cable attachment 50.

The slide assembly 10 includes a slave slide 52 which leads or follows the drive slide 34 in the slide track 63 (depending on the direction of movement). A second lever 54 rotatably links the slave slide 52 to the connector 42. The second lever 54 is rotatably attached to the slave slide 52 by a second pivot 56, near a first end 58 of the second lever 54. The second lever 54 is rotatably attached to the connector 42 by the connector pivot 45 near a second end 59 of the second lever 54.

Preferably, the drive slide 34 and the slave slide 52 are linked by elastic members (springs) 60. The elastic members 60 are attached to the drive slide 34 and the slave slide 52 by pins 57.

Preferably, the connector 42 is attached to the attaching member 46 by securing members 62 that are inserted into securing apertures 64 in the connector 42 when the connector 42 is inserted into the attaching member 46.

Figure 7:
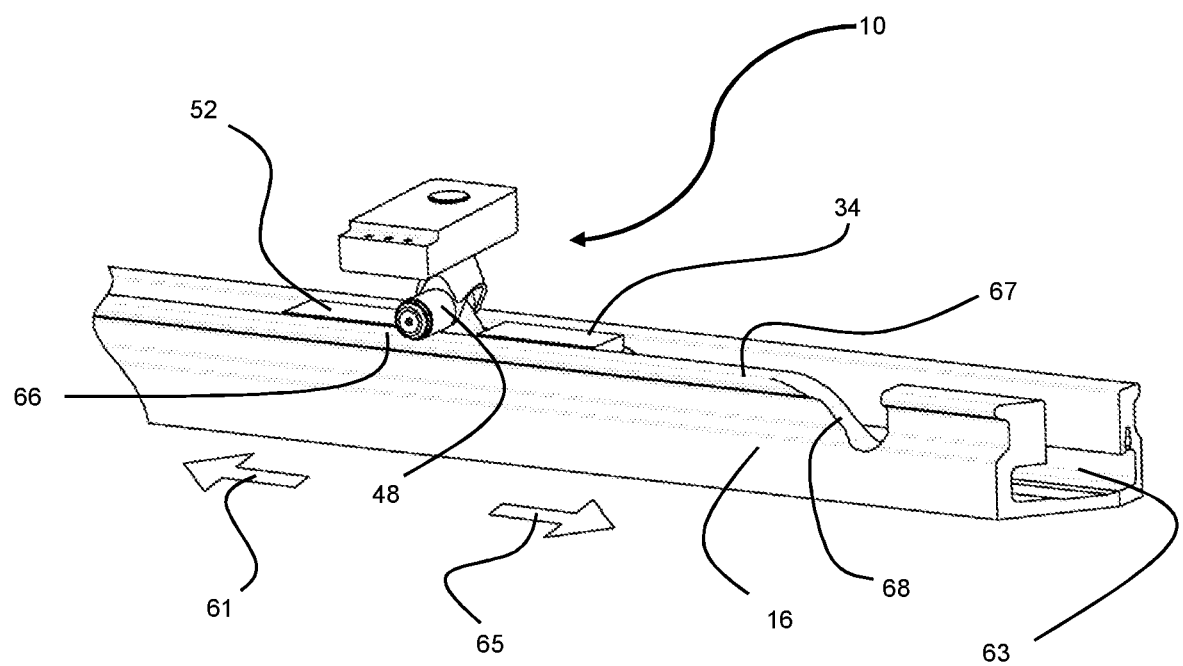
FIG. 7 shows a perspective view of a slide guide containing the slide assembly of FIG. 6 in a lifted configuration.
Figure 8:
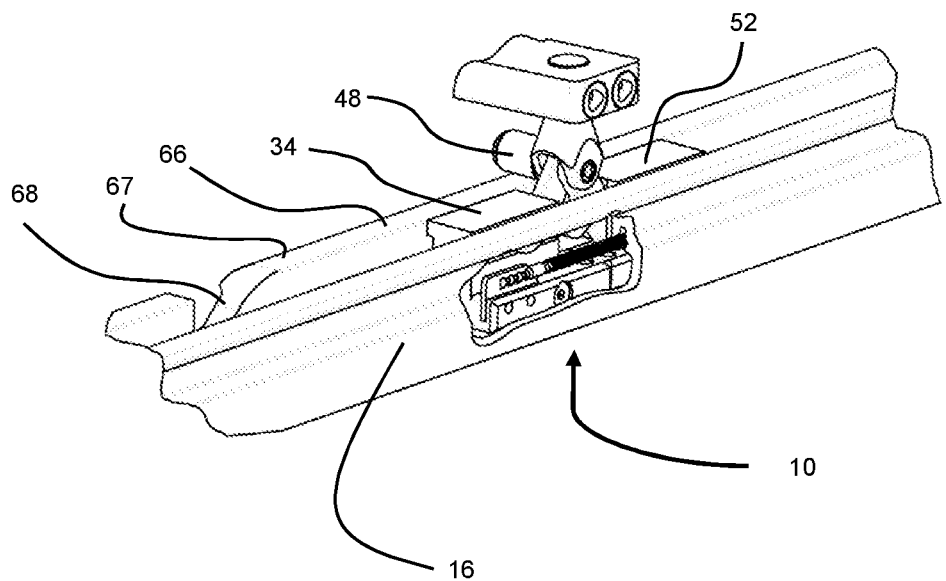
FIG. 8 shows a perspective view of a slide guide containing the slide assembly of FIG. 6 in a lifted configuration with a partial cutaway from a different direction compared with FIG. 7.

FIGS. 7 and 8 show perspective views of the slide assembly 10 in a lifted configuration. The slide assembly 10 is arranged so that the drive slide 34 is driveably moveable on a slide track 63 in the slide guide 16. The slave slide 52 follows the drive slide 34 and is slideably moveable on the slide track 63. Both the drive slide 34 and slave slide 52 can slide along the slide track 63 in a forward direction 65 and a rearward direction 61. The slide guide 16 includes a guide rail 66, the guide rail 66 having a rearward raised portion 67 and a forward depressed portion 68. The guide rail 66 supports the guide rail follower 48 so that the guide rail follower 48 can travel along the guide rail 66. In this configuration, the guide rail follower 48 is supported on the rearward raised portion 67 and the drive slide 34 and the slave slide 52 are positioned together.

Figure 9:
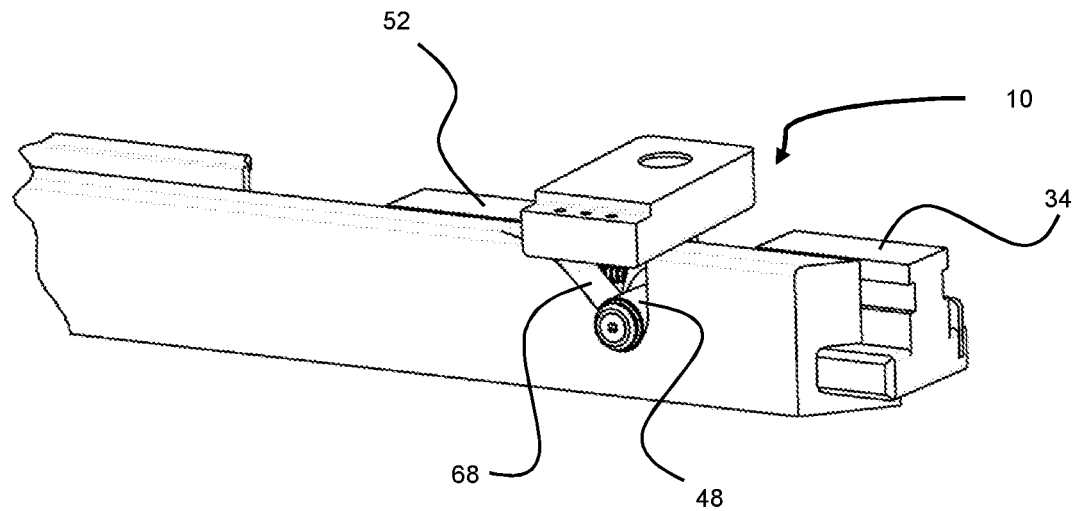
FIG. 9 shows a perspective view of the slide guide containing the slide assembly of FIG. 6 in a lowered configuration.
Figure 10:
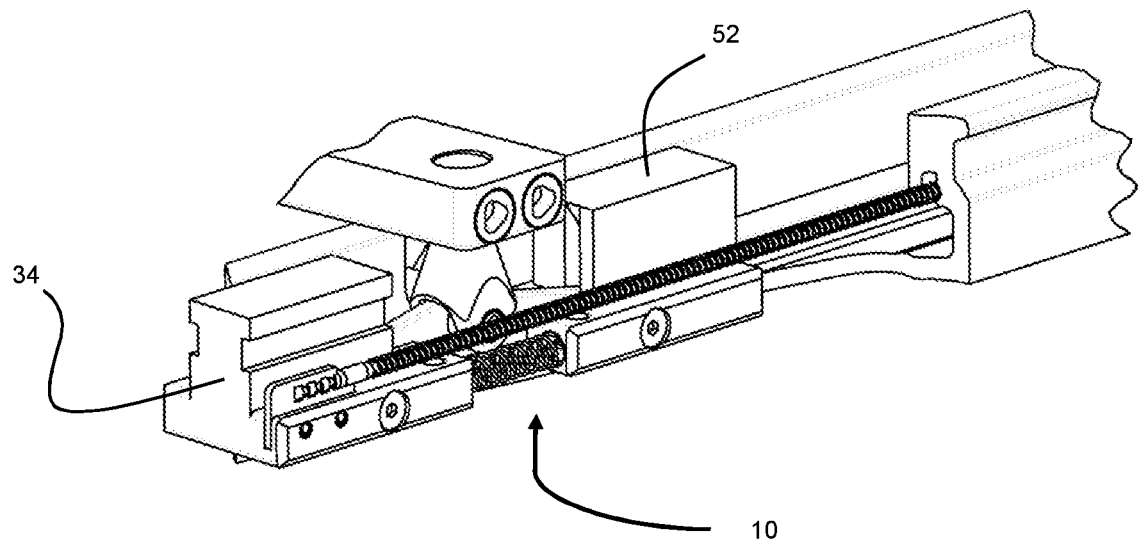
FIG. 10 shows a perspective view of the slide guide containing the slide assembly of FIG. 6 in a lowered configuration with part of the slide guide cut away.

FIGS. 9 and 10 show perspective views of the slide assembly 10 in a lowered configuration. In this configuration, the guide rail follower 48 has travelled along the forward depressed portion 68 and the drive slide 34 is positioned apart from the slave slide 52.

Figure 11:
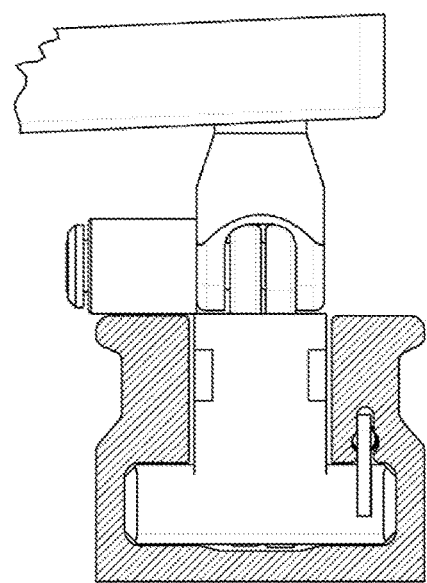
FIG. 11 shows a front cross sectional view of the slide guide containing the slide assembly of FIG. 6 in a lifted configuration
Figure 12:
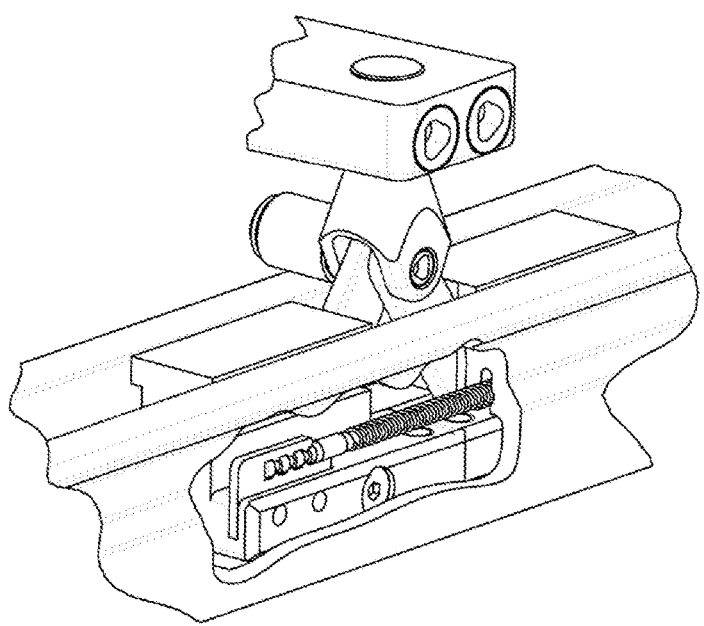
FIG. 12 shows in enlarged view the arrangement shown in FIG. 8.

FIGS. 11 and 12 show a front view and perspective view respectively of the slide assembly 10 in a lifted configuration.

Figure 13:
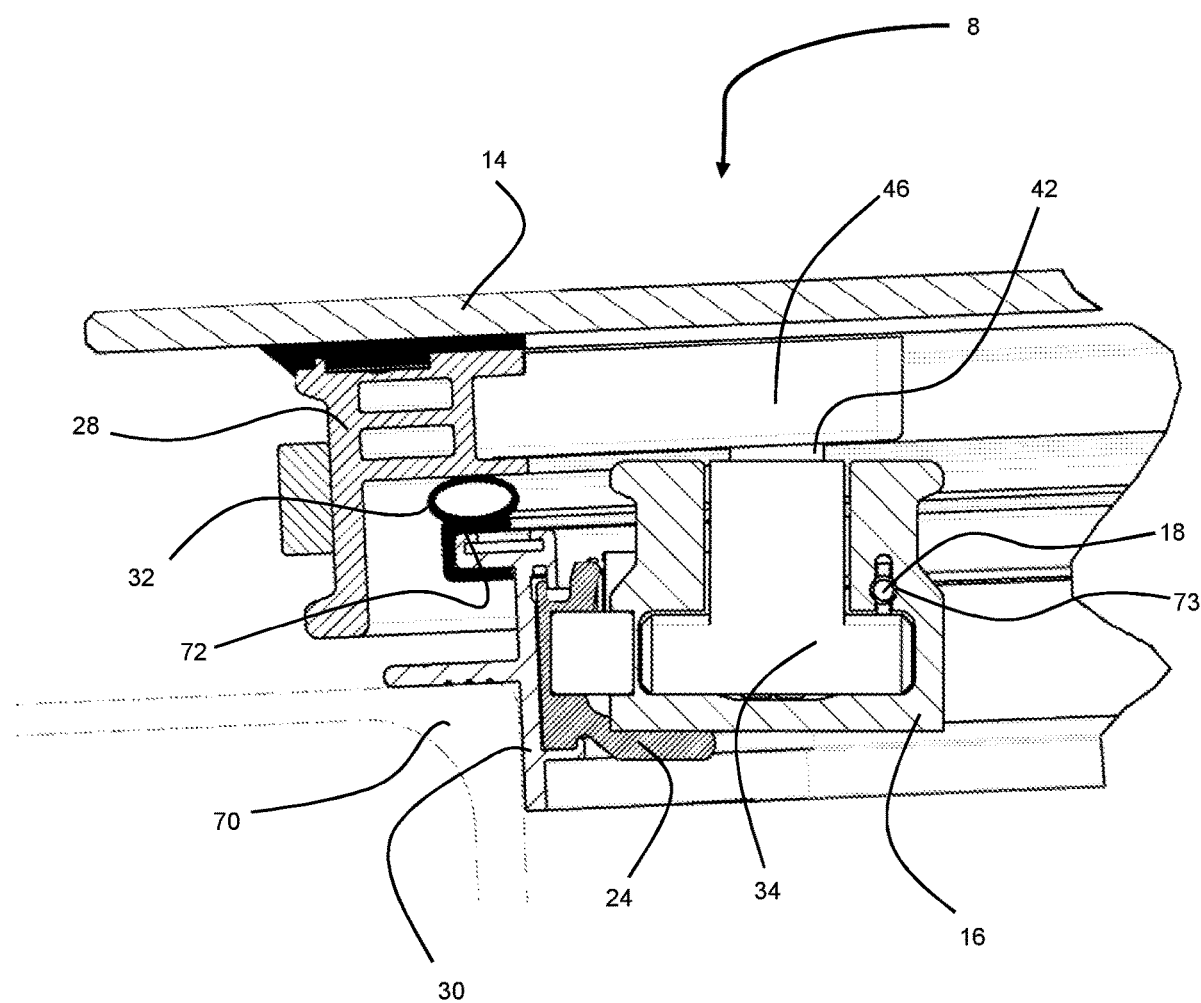
FIG. 13 shows a cross sectional front view of the sliding roof panel assembly of FIG. 1 in a lowered position.

FIG. 13 shows a cutaway front view of the sliding roof panel assembly 8 in a closed and lowered position. The base frame 30 is fixed to a base structure 70 that defines a roof opening, such as the deck of a marine vessel. The seal 32 is attached to an upper surface 72 of the base frame 30 so that when the roof panel 14 is lowered, the roof panel frame 28 contacts and compresses the seal 32. The slide guide bracket 24 fixes the slide guide 16 to the base frame 30. The attaching member 46 attaches the roof panel frame 28 to the connector 42. The drive cable 18 is housed in a drive cable channel 73 which runs along the slide guide 16.

Figure 14:
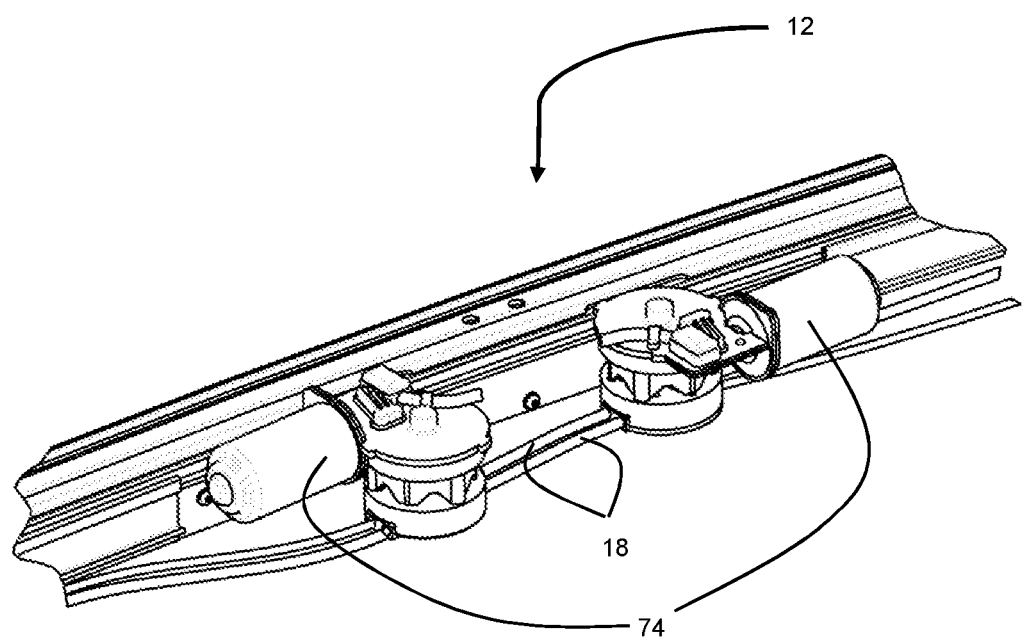
FIG. 14 shows a perspective view of the drive motor assembly of FIG. 1.
Figure 15:
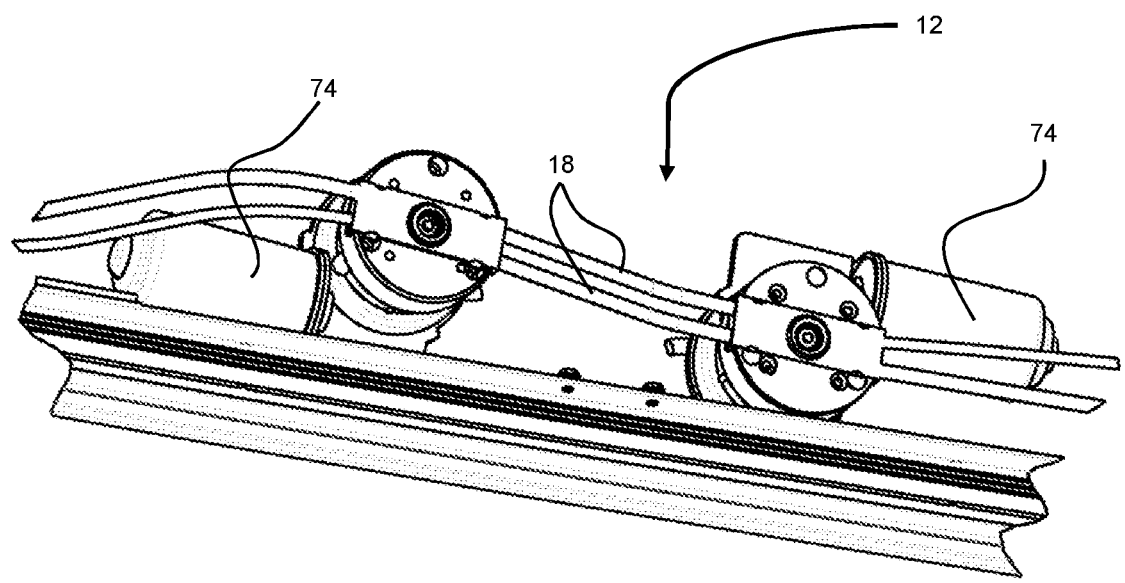
FIG. 15 shows another perspective view of the drive motor assembly of FIG. 1.
Figure 16:
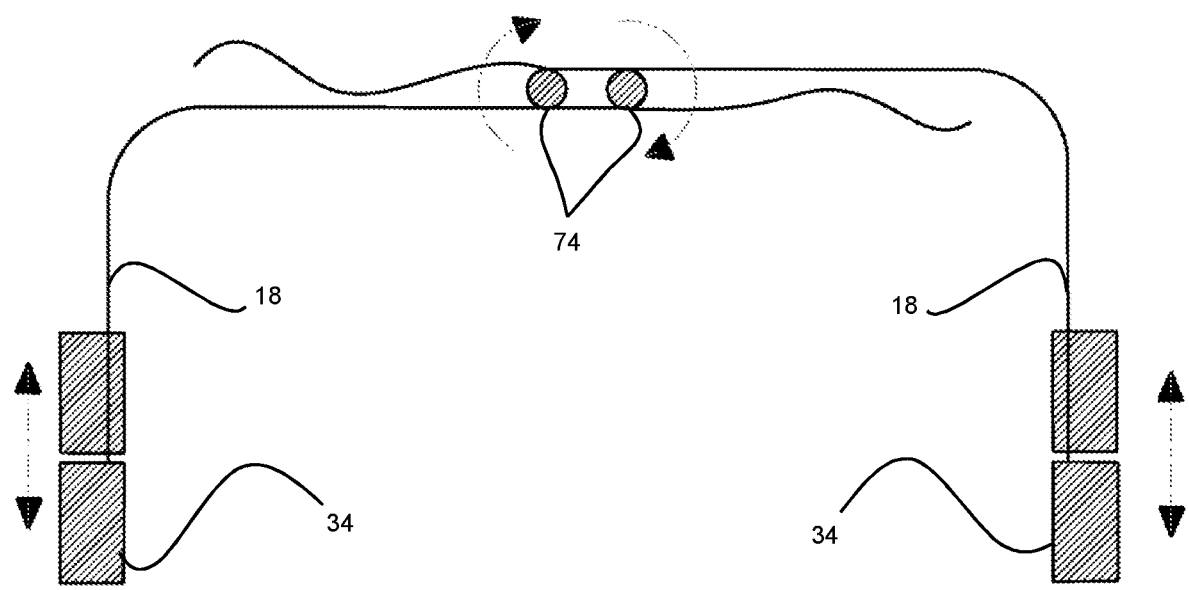
FIG. 16 shows a schematic plan view of the drive motor assembly of FIG. 1.

FIGS. 14 and 15 show perspective views of the drive motor assembly 12 and FIG. 16 shows a schematic plan view of the drive motor assembly 12. The drive motor assembly 12 includes drive motors 74 which drive the drive cables 18. The drive cables 18 are preferably comprise a helical protrusion extending from their outer circumference. The helical protrusions engage with gears driven by the drive motors 74. Each drive cable 18 is attached to a drive slide 34 and is configured to move the drive slide 34 along the slide guide 16 when driven by the respective drive motor 74.

Figure 17:
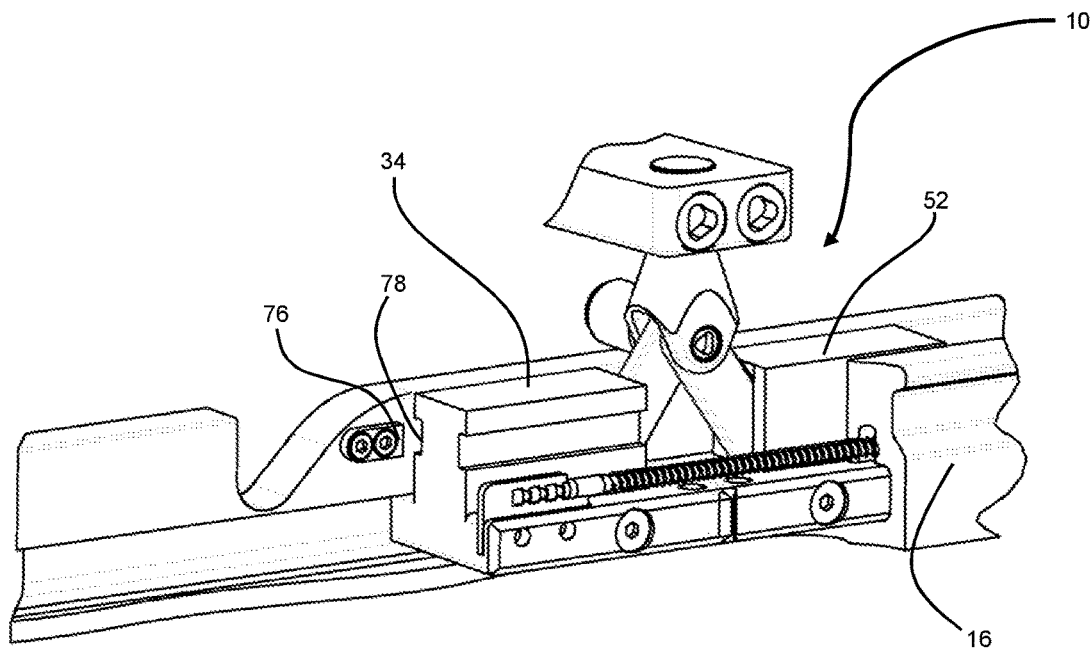
FIG. 17 shows a perspective view of the slide guide containing a slide assembly according to an embodiment of the invention, the assembly being in a lifted configuration and being provided with a locking element.
Figure 18:
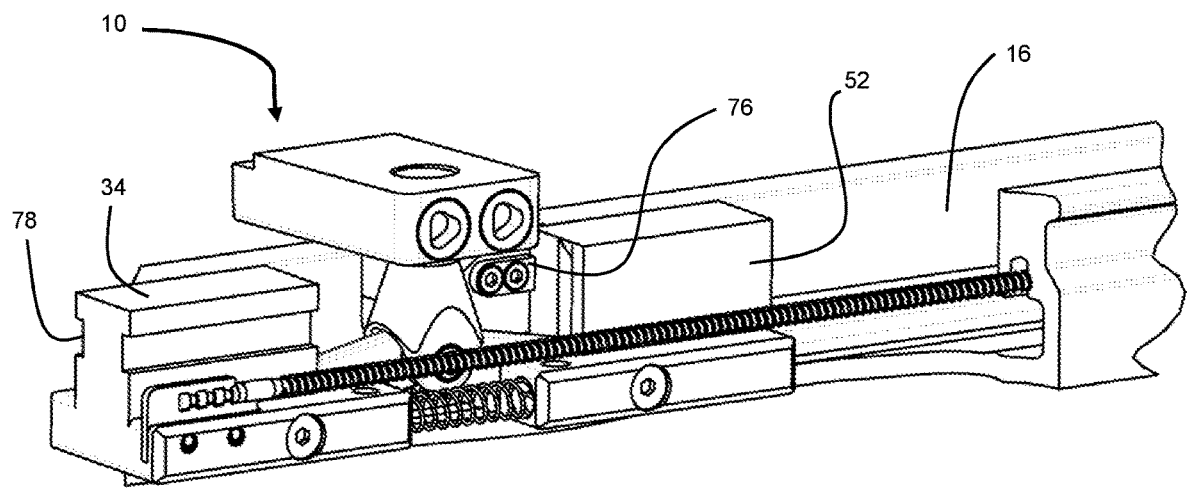
FIG. 18 shows a perspective view of the slide guide of FIG. 17 but in a lowered configuration.
Figure 19:
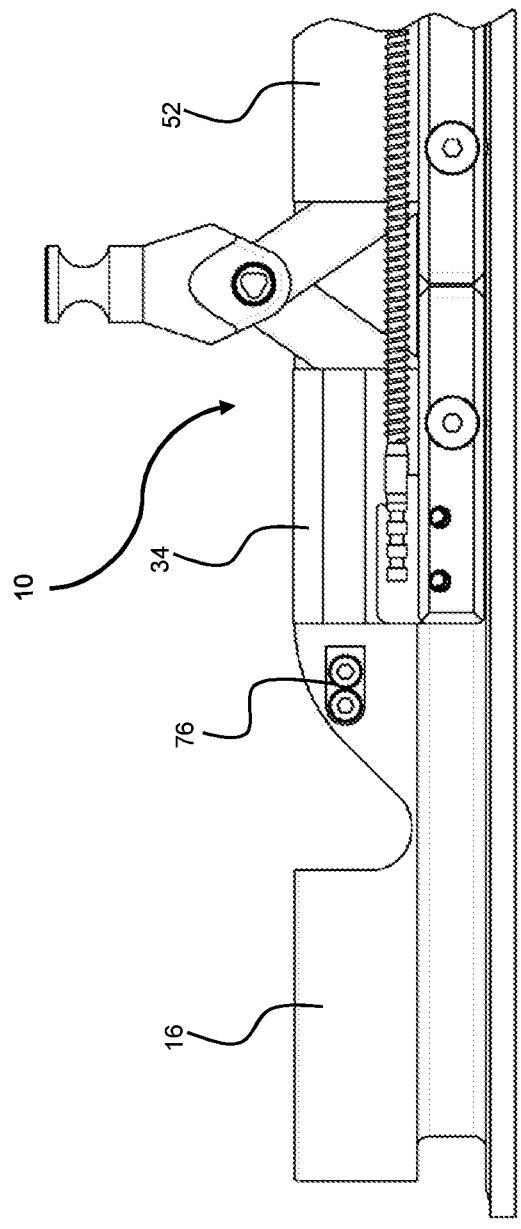
FIG. 19 shows a side view of the slide guide of FIG. 17 in a lifted configuration.
Figure 20:
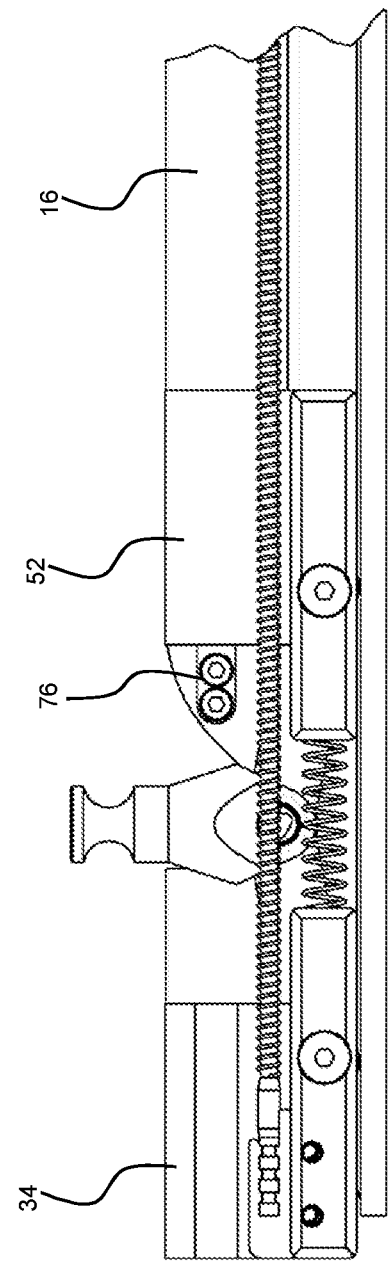
FIG. 20 shows a side view of the slide guide of FIG. 17 but in a lowered configuration.
Figure 22:
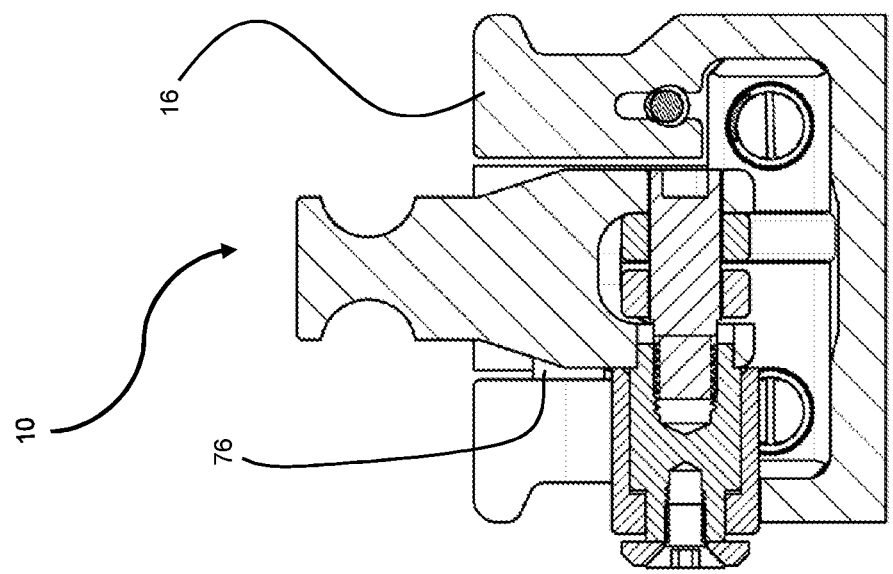
FIG. 22 shows a front view of the slide guide of FIG. 17 but in a lowered configuration.
Figure 21:
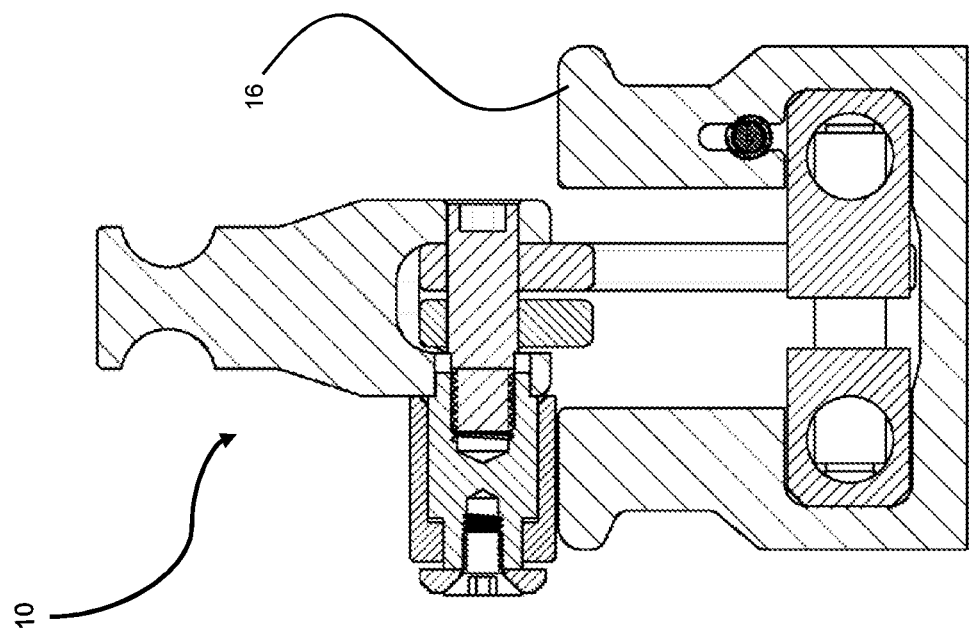
FIG. 21 shows a front view of the slide guide of FIG. 17 in a lifted configuration.

FIGS. 17, 19 and 21 show perspective, side and front views respectively of the slide assembly 10 within the slide guide 16 in a lifted configuration. FIGS. 18, 20 and 22 show perspective, side and front views respectively of the slide assembly 10 within the slide guide 16 in a lowered configuration. Preferably, a lock 76 is fixed to the slide guide 16. The drive slide 34 is configured to have a bypass aperture 78 through which the lock 76 passes when the drive slide 34 travels within the slide guide 16. The lock 76 contacts the slave slide 52 and restricts further forward movement of the slave slide 52 along the slide guide 16 when the sliding roof panel assembly is in the covered and sealed position.

The principle of operation of the apparatus will now be explained.

FIG. 3 shows the sliding roof panel assembly 8 in a closed and lowered configuration, where the roof panel 14 is in a closed and lowered positioned to cover a roof opening. In this position, the roof panel 14 is at its furthest point forward and is lowered towards the roof opening so that the roof panel frame 28 contacts and compresses the seal 32 (not shown).

FIG. 4 shows the sliding roof panel assembly 8 in an uncovered position. In this position, the roof panel 14 has moved rearward to uncover a roof opening. Here the roof panel frame 28 is lifted away from the seal 32 and the base frame 30. This lifting action ensures the roof panel 14 can travel rearward without interference between the roof panel frame 28 and the base frame 30 to ensure there is no frictional contact between the roof panel frame 28 and the seal 32, which could cause the seal to wear.

The roof panel 14 is attached to and driven by the slide assembly 10. In preferred embodiments, the slide assembly 10 is driven by the drive cable 18 and the drive cable 18 is driven by the drive motor assembly 12. To move the roof panel 14 to a closed and lowered position, the drive motor 74 pushes the drive cable 18 and the drive cable 18 pushes the drive slide 34 forward on the slide track 63 in the slide guide 16. To move the roof panel 14 to an open and lifted position, the drive motor 74 pulls the drive cable 18 which pulls the drive slide 34 rearward on the slide track 63 in the slide guide 16.

When the roof panel 14 is in the closed and lowered position, as in FIG. 3, the slide assembly 10 is in the lowered configuration. The guide rail follower 48 is positioned on the forward depressed portion 68 of the guide rail 66.

When the roof panel 14 is in a closed and lowered position, if the drive slide 34 is driven rearward, the slide assembly 10 begins to move rearwards along the slide track 63. The guide rail follower 48 travels upwardly along the forward depressed portion 68 relative to the drive slide 34 by reaction of the forward depressed portion 68 and rotation of the first lever 36, until the guide rail follower 48 reaches the rearward raised portion 67 of the guide rail 66. The roof panel 14 follows the movement of the guide rail follower 48 upwardly towards the open and lifted position.

When the roof panel 14 is in is the open and lifted position, as in FIG. 4, the slide assembly is in the lifted configuration. The guide rail follower 48 is positioned on rearward raised portion 67 of the guide rail 66.

To further open the roof panel 14, the drive slide 34 is driven further rearward and the guide rail follower 48 travels along the rearward raised portion 67 of the guide rail 66. The roof panel 14 follows the movement of the guide rail follower 48.

When the roof panel 14 is in an open and lifted position, if the drive slide 34 is driven forward, the slide assembly 10 begins to move forwards along the slide track 63. The guide rail follower 48 travels along the rearward raised portion 67 of the guide rail 66 until it reaches the forward depressed portion 68. The guide rail follower 48 then travels downwardly along the forward depressed portion 68 of the guide rail 66 relative to the drive slide 34 by the weight of the roof panel 14 and rotation of the first lever 36. The roof panel 14 follows the movement of the guide rail follower 48 downwardly towards the closed and lowered position.

As the roof panel 14 lifts and lowers, the first lever 36 rotates about the first pivot 38 in the drive slide 34. There is only rotational movement between the first lever 36 and the drive slide 34. As such, there is no sliding friction between the first lever 36 and drive slide 34 and therefore less chance of material failure due to wearing. Because the roof panel 48 follows the guide rail follower 48 as the guide rail follower 48 travels downwardly and upwardly, the first lever 36 requires only two pivot points, as opposed to more than two in the prior art where the roof panel opposes the guide rail follower's movement. As such, the process of manufacturing, assembling and maintaining the slide assembly 10 is simple.

The sliding roof panel assembly 8 includes a slave slide 52 as described above. The slave slide 52 follows the movement of the drive slide 34 in the slide track 63. As the roof panel 14 moves from the closed and lowered position to the open and lifted position, the second lever 54 rotates accordingly and the drive slide 34 and the slave slide 52 are driven closer together within the slide track 63. As the roof panel 14 moves from the open and lifted position to the closed and lowered position, the second lever 54 rotates accordingly and the drive slide 34 and the slave slide 52 are driven further apart within the slide track 63. The slave slide 52 and second lever 54 provide stability and balance to the sliding roof panel assembly 8 in use. The slave slide 52 and second lever 54 also help prevent the guide follower 48 from moving in a horizontal direction perpendicular to the direction of travel of the drive slide 34. This is because the second lever 54 provides an element of stiffness to the slide assembly, thereby helping to prevent the first lever 36 from pivoting in this horizontal direction.

When the roof panel 14 is in the open and lifted position, the drive slide 34 and the slave slide 52 are in contact or close to being in contact. This helps to restrict any further lifting of the roof panel 14 because the first lever 36 and the second lever 54 are prevented from rotating further towards a vertical orientation. This is particularly advantageous when the guide rail follower 48 is at risk of rattling or lifting from the guide rail 66, for example when the sliding panel assembly 8 is mounted on a marine vessel in rough seas.

The lock 76 is attached to the slide guide 16 so that the lock 76 prevents the slave slide 52 from moving forward in the slide track 63 when roof panel 14 is in the closed and lowered position. This locks the roof panel 14 in the closed and lowered position when the drive slide 34 is prevented from moving in the slide track 63. This is particularly advantageous where a tight seal needs to be kept between the panel frame 28 and the base frame 30.

Another advantage of the lock 76 is that the sliding roof panel assembly can be used on an inclined plane where the weight of the roof panel 14 may not force the guide rail follower 48 into the slot 68. In this case, when the slave slide 52 contacts the lock 76, and as the drive slide 34 is driven forward, the roof panel 14 will be forced to a lowered position by rotation of the first lever 36 and the second lever 54.

The drive slide 34 has a bypass aperture 78. As the drive slide 34 travels on the slide track 63, the bypass aperture 78 prevents contact between the lock 76 and the drive slide 34. This allows the drive slide 34 and the slave slide 52 to travel together in the slide track 63 when the lock 76 is statically fixed within the slide guide 16.

The elastic member 60 links the drive slide 34 to the slave slide 52. In one embodiment, the elastic member can bias the drive slide 34 and the slave slide 52 towards each other. This helps stabilise the slide assembly 10 as it travels along the slide guide 16 by preventing the slave slide 52 from trailing behind the drive slide 34. This biasing also helps to lift the roof panel 14 as the guide rail follower 48 travels upwardly along the forward depressed portion 68 of the guide rail 66 by forcing the respective rotation of the first lever arm 36 and the second lever arm 54. This reduces the force required to drive the drive slide 34 rearwards. In another embodiment, the elastic member can bias the drive slide 34 and the slave slide 52 apart. This biasing provides a downward force on the guide rail follower 48 and, when the roof panel 14 is in the open and lifted position, this helps to prevent the guide follower 48 and the roof panel 14 from lifting. In another embodiment, the elastic member 60 can bias the drive slide 34 and the slave slide 52 to an intermediate position so that both the above advantages are realised.

The connector 42 connects the slide assembly 10 to the roof panel 14 the connector 42 defining a securing aperture 64. During assembly, the slide assembly can be assembled with the slide guide 16 and, at a later time, the roof panel 14 can be lowered onto the connector 42 and secured with securing members 62. The connector 42 could be inserted into an attaching member 46.

The drive slide 34 can be driven by the drive cable 18. The drive cable 18 is attached to the drive slide 34 by cable attachment 50. The drive cable 18 allows the drive slide 34 to be driven remotely by providing a force to the drive cable 18 at a distance away from the drive slide 34. This is particularly advantageous when access to the drive slide 34 is difficult, for example if the sliding roof panel assembly 8 is out of reach or a trim covers the drive slide 34.

The drive cable 18 can be driven by engagement with a drive motor 74 in the drive motor assembly 12. This allows the roof panel 14 to opened and closed without manual effort by the operator. Additionally, the drive motor 74 can be activated remotely, which is particularly advantageous when the drive cable 18 is out of reach.

The drive cable 18 can have a helical protrusion extending from its outer circumference. This helical protrusion can engage with a gear connected to the drive motor 74 which provides a more secure engagement, preventing the drive cable 18 from slipping past the drive motor 74. This is particularly advantageous when the roof panel 14 is heavy and a large driving force is required to move it.

The drive cable 18 can be contained in a channel 73 in the slide guide 16. The channel 73 runs along the length of the slide guide 16 and allows the drive cable 18 to provide a pushing force to the drive slide 34 without buckling. Additionally, the channel 73 shields the drive cable 18, providing a safer and more aesthetically pleasing mechanism.

The roof panel 14 can be supported by a support pivot 20 near rearward end of the roof panel 14. As the roof panel 14 moves from the lifted position to the lowered position (and vice versa), it pivots about the support pivot 20. This provides a stable and balanced movement.

The support pivot 20 can slidably move on a support track 22. As the roof panel 14 moves in a forward and rearward direction, the support pivot 20 moves forwardly and rearwardly respectively on the support track 22. This allows the roof panel 14 to rotate and move forward (or backward) simultaneously. This also provides a stable and balanced movement.

The drive slide 34 can be rotatably linked to the guide rail follower 48 and the connector 42 via the first lever 36. During assembly, the connector pivot 45 is inserted through the first lever 36, the connector 42 and the guide rail follower 48. A common rotational axis shared between these components provides a more simple mechanism, reducing the number of parts and simplifying assembly.

The slave slide 52 can be rotatably linked to the guide rail follower 48 and the connector 42 via the second lever 54. During assembly, the connector pivot 45 is inserted through the second lever 54, the connector 42 and the guide rail follower 48. A common rotational axis shared between these components provides a more simple mechanism, reducing the number of parts and simplifying assembly.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A sliding roof panel assembly for covering a roof opening, the sliding roof panel assembly comprising:
a slide guide for attachment along one side of the roof opening;
a roof panel which is slidably moveable between an open and lifted position and a closed and lowered position, the roof opening being covered by the roof panel in the closed and lowered position;
a slide assembly guided for travel along the slide guide and supporting the roof panel, wherein the slide guide has a slide track and a guide rail, the slide track and the guide rail each extending along the slide guide, the guide rail having a forward depressed portion and a rearward raised portion,
the slide assembly comprising:
a drive slide driveably moveable along the slide track of the slide guide;
a guide rail follower supported by and moveable along the guide rail, the guide rail follower supporting the roof panel;
a first lever, linking the drive slide and the roof panel via respective rotatable links, wherein, in use, the roof panel is slidably moveable from the open and lifted position to the closed and lowered position by driving the drive slide forward in the slide track to move the guide rail follower forward along the rearward raised portion of the guide rail until the guide rail follower reaches the forward depressed portion of the guide rail, the guide rail follower travelling downwardly along the forward depressed portion of the guide rail relative to the drive slide by the weight of the roof panel and rotation of the first lever, the roof panel following the movement of the guide rail follower downwardly towards the closed and lowered position,
the slide assembly further comprising:
a support pivot for attachment to a base structure surrounding the roof opening, the support pivot pivotally supporting the roof panel, wherein, in use, the roof panel pivots about the support pivot as the roof panel moves from a lifted position to a lowered position; and
a support track fixed to the base structure surrounding the roof opening, wherein, in use, the support pivot slidably moves along the support track and is guided by the support track as the roof panel moves from the open and lifted position to a closed and lowered position.

2. A sliding roof panel assembly according to claim 1 having two of said slide guides, each for attachment respectively along opposing sides of the roof opening.

3. A sliding roof panel assembly according to claim 1 comprising:
   a slave slide moveable along the slide track of the slide guide with the drive slide; and
   a second lever, linking the slave slide and the roof panel via respective rotatable links, the first and second levers thereby linking the slave slide and the drive slide.

4. A sliding roof panel assembly according to claim 3 wherein, in use moving the roof panel towards the open and lifted position, the slave slide is pushed along the slide track by the drive slide.

5. A sliding roof panel assembly according to claim 3 further comprising a locking element disposed within the slide track for defining a forward limit of motion for the slave slide along the slide track when the roof panel is in the closed and lowered position.

6. A sliding roof panel assembly according to claim 3 wherein the drive slide has a bypass feature to permit the drive slide to travel forwardly of the locking element along the slide track.

7. A sliding roof panel assembly according to claim 3 further comprising an elastic member linking the drive slide and the slave slide.

8. A sliding roof panel assembly according to claim 3 wherein the slave slide is rotatably linked to the guide rail follower via the second lever.

9. A sliding roof panel assembly according to claim 1 further comprising:
   a connector linking the slide assembly to the panel; and
   a securing member,
wherein the securing member is inserted through the connector to attach the connector to the roof panel.

10. A sliding roof panel assembly according to claim 1 further comprising a drive cable for driving the drive slide.

11. A sliding roof panel assembly according to claim 10 further comprising a drive motor for driving the drive cable.

12. A sliding roof panel assembly according to claim 10 wherein the drive cable has a helical protrusion at its outer circumference, for driving engagement with the motor.

13. A sliding roof panel assembly according to claim 10 wherein the drive cable is contained within a channel in the guide slide.

14. A sliding roof panel assembly according to claim 1 wherein the drive slide is rotatably linked to the guide rail follower via the first lever.

15. A sliding roof panel assembly according to claim 1 wherein the roof panel is made of a light-transmitting material.

16. A sliding roof panel assembly according to claim 1 wherein the roof panel is made of a composite material.

17. A marine pleasure craft having a sliding roof panel assembly covering a roof opening of the marine pleasure craft, the sliding roof panel assembly comprising:
   a slide guide for attachment along one side of the roof opening;
   a roof panel which is slidably moveable between an open and lifted position and a closed and lowered position, the roof opening being covered by the roof panel in the closed and lowered position;
   a slide assembly guided for travel along the slide guide and supporting the roof panel, wherein the slide guide has a slide track and a guide rail, the slide track and the guide rail each extending along the slide guide, the guide rail having a forward depressed portion and a rearward raised portion,
   the slide assembly comprising:
   a drive slide driveably moveable along the slide track of the slide guide;
   a guide rail follower supported by and moveable along the guide rail, the guide rail follower supporting the roof panel;
   a first lever, linking the drive slide and the roof panel via respective rotatable links, wherein, in use, the roof panel is slidably moveable from the open and lifted position to the closed and lowered position by driving the drive slide forward in the slide track to move the guide rail follower forward along the rearward raised portion of the guide rail until the guide rail follower reaches the forward depressed portion of the guide rail, the guide rail follower travelling downwardly along the forward depressed portion of the guide rail relative to the drive slide by the weight of the roof panel and rotation of the first lever, the roof panel following the movement of the guide rail follower downwardly towards the closed and lowered position;
   the slide assembly further comprising:
   a support pivot for attachment to a base structure surrounding the roof opening, the support pivot pivotally supporting the roof panel, wherein, in use, the roof panel pivots about the support pivot as the roof panel moves from a lifted position to a lowered position; and
   a support track fixed to the base structure surrounding the roof opening, wherein, in use, the support pivot slidably moves along the support track and is guided by the support track as the roof panel moves from the open and lifted position to a closed and lowered position.

18. A marine pleasure craft according to claim 17 wherein the sliding roof panel assembly is fitted to as to move from the closed and lowered position to the open and lifted position in a direction from a stern of the craft towards a bow of the craft.

19. A marine pleasure craft according to claim 17 wherein the sliding roof panel assembly is fitted to as to move from the closed and lowered position to the open and lifted position in a direction from a bow of the craft towards a stern of the craft.

20. A method for the operation of a sliding roof panel assembly, the sliding roof panel assembly comprising:
   a slide guide for attachment along one side of the roof opening;
   a roof panel which is slidably moveable between an open and lifted position and a closed and lowered position, the roof opening being covered by the roof panel in the closed and lowered position;
   a slide assembly guided for travel along the slide guide and supporting the roof panel, wherein the slide guide has a slide track and a guide rail, the slide track and the guide rail each extending along the slide guide, the guide rail having a forward depressed portion and a rearward raised portion,
   the slide assembly comprising:
   a drive slide driveably moveable along the slide track of the slide guide;
   a guide rail follower supported by and moveable along the guide rail, the guide rail follower supporting the roof panel;
   a first lever, linking the drive slide and the roof panel via respective rotatable links, wherein, in use, the roof panel is slidably moveable from the open and lifted position to the closed and lowered position by driving the drive slide forward in the slide track to move the guide rail follower forward along the rearward raised portion of the guide rail until the guide rail follower reaches the forward depressed portion of the guide rail, the guide rail follower travelling downwardly along the forward depressed portion of the guide rail relative to the drive slide by the weight of the roof panel and rotation of the first lever, the roof panel following the movement of the guide rail follower downwardly towards the closed and lowered position, the method comprising slidably moving the roof panel from the open and lifted position to the closed and lowered position by driving the drive slide forward in the slide track to move the guide rail follower forward along the rearward raised portion of the guide rail until the guide rail follower reaches the forward depressed portion of the guide rail, the guide rail follower travelling downwardly along the forward depressed portion of the guide rail relative to the drive slide by the weight of the roof panel and rotation of the first lever, the roof panel following the movement of the guide rail follower downwardly towards the closed and lowered position;

the slide assembly further comprising:

a support pivot for attachment to a base structure surrounding the roof opening, the support pivot pivotally supporting the roof panel, wherein, in use, the roof panel pivots about the support pivot as the roof panel moves from a lifted position to a lowered position; and a support track fixed to the base structure surrounding the roof opening, wherein, in use, the support pivot slidably moves along the support track and is guided by the support track as the roof panel moves from the open and lifted position to a closed and lowered position.

21. A method according to claim 20, the method comprising slidably moving the roof panel from the closed and lowered position to the open and lifted position by driving the drive slide rearward in the slide track to move the guide rail follower rearward along the forward depressed portion of the guide rail, the guide rail follower travelling upwardly along the forward depressed portion of the guide rail relative to the drive slide by reaction of the forward depressed portion and rotation of the first lever until the guide rail follower reaches the rearward raised portion of the guide rail, the roof panel following the movement of the guide rail follower upwardly towards the open and lifted position.

* * * * *